United States Patent
Lehavi et al.

(10) Patent No.: US 8,887,160 B2
(45) Date of Patent: Nov. 11, 2014

(54) MAPPING TASKS TO EXECUTION THREADS

(75) Inventors: David Lehavi, Haifa (IL); Sagi Schein, Kiryat Tivon (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 235 days.

(21) Appl. No.: 13/301,301

(22) Filed: Nov. 21, 2011

(65) Prior Publication Data

US 2013/0132961 A1 May 23, 2013

(51) Int. Cl.
*G06F 9/46* (2006.01)
*G06F 9/50* (2006.01)

(52) U.S. Cl.
CPC ........ *G06F 9/5027* (2013.01); *G06F 2209/503* (2013.01)
USPC .......................................... 718/100; 718/102

(58) Field of Classification Search
CPC . G06F 9/522; G06F 15/8007; G06F 15/8015; G06F 9/3009; G06F 9/3887
See application file for complete search history.

(56) References Cited

U.S. PATENT DOCUMENTS

| | | | |
|---|---|---|---|
| 7,643,353 B1 * | 1/2010 | Srinivasan et al. | 365/189.02 |
| 7,886,272 B1 * | 2/2011 | Episkopos et al. | 717/124 |
| 2004/0186863 A1 * | 9/2004 | Garthwaite | 707/206 |
| 2005/0108720 A1 * | 5/2005 | Cervini | 718/105 |
| 2006/0195508 A1 * | 8/2006 | Bernardin et al. | 709/203 |
| 2008/0077928 A1 * | 3/2008 | Matsuzaki et al. | 718/104 |
| 2010/0199276 A1 * | 8/2010 | Umbehocker | 718/1 |
| 2011/0067029 A1 * | 3/2011 | Wolfe et al. | 718/102 |
| 2011/0078427 A1 * | 3/2011 | Shebanow et al. | 712/244 |
| 2011/0252046 A1 * | 10/2011 | Szabo et al. | 707/758 |

OTHER PUBLICATIONS

Xinyan Zha, Sartaj Sahni; Multipattern String Matching on a GPU; ; IEEE 2011.*
Nvidia; NVIDIA_Fermi_Compute_Architecture_Whitepaper; 2009.*
Russ Cox (2009): "Regular Expression Matching: the Virtual Machine Approach", available at http://swtch.com/~rsc/regexp/regexp2.html.
Russ Cox (2007), Regular Expression Matching Can Be Simple and Fast (but is slow in Java, Perl, PHP, Python, uby, . . .), available at http://swtch.com/~rsc/regexp/regexp1.html.
G. Vasiliadis et al., Regular Expression Matching on Graphics Hardware for Intrusion Detection, (RAID 2009) at www.ics.forth.gr/dcs/Activities/papers/gnort-regexp.raid09.pdf.
N. Cascarano, et al., (2010) iNFAnt: NFA Pattern Matching on GPGPU Devices, available at http://netgroup.polito.it/pubs/pdf/2010/iNFAnt-CCR.pdf.
Randy Smith, et al., Evaluating GPUs for Network Packet Signature Matching, available at http://pages.cs.wisc.edu/~smithr/pubs/ispass_2009_slides.pdf.

* cited by examiner

*Primary Examiner* — Emerson Puente
*Assistant Examiner* — Dong Kim

(57) ABSTRACT

Tasks are mapped to execution threads of a parallel processing device. Tasks are mapped from the list of tasks to execution threads of the parallel processing device that are free. The parallel processing device is allowed to perform the tasks mapped to the execution threads of the parallel processing device for a predetermined number of execution cycles. When the parallel processing device has performed the tasks mapped to the execution threads of the parallel processing device for the predetermined number of execution cycles, the parallel processing device is suspended from further performing the tasks to allow the parallel processing device to determine which execution threads have completed performance of mapped tasks and are therefore free.

12 Claims, 2 Drawing Sheets

MAPPING TASKS TO EXECUTION THREADS

BACKGROUND

In regular expression matching, strings of data are searched for a particular pattern of data, called a regular expression or regex. The regex may be, for example, a word, words or pattern of characters. Regular expression matching can be used in a variety of applications such as, for example, searching for text patterns in a document or inspecting packets of information sent over a network to detect malicious code.

Regular expression matching, and many other types of operations, can be performed by dividing the operation into tasks that can be processed by multiple threads of execution. A thread of execution, or execution thread, is the smallest unit of processing that can be scheduled by an operating system. A process scheduler can be used to schedule execution threads to be processed in parallel. Parallel processing may be performed, for example, by parallel processing devices such as graphics processing units, vectorized central processing units and field programmable gate arrays programmed to perform parallel processing

DETAILED DESCRIPTION

Because of their high compute density, single instruction multiple data (SIMD) machines can be very usefully employed in compute intensive operations such as graphics processing. For this reason many graphics processing units (GPUs) are implemented by SIMD machines.

When adapting SIMDs to other parallel processing tasks, such as regular expression matching, various challenges can arise. These include, for example, the variable time it takes to execute different tasks on an execution thread and inefficiencies that occur when SIMDs handle branch operations.

Herein is described how tasks can be mapped to execution threads to allow for efficient processing even when there is wide variation in execution time required for different tasks. This description is presented in the context of employing a GPU to perform regular expression matching. While a specific embodiment of regular expression matching is described herein, as will be understood by persons of ordinary skill in the art, this is only an exemplary illustration of an embodiment where tasks may be mapped to execution threads. As will be understood by persons of ordinary skill in the art, efficiently mapping tasks to execution threads is useful for a variety of other applications such as those applications implemented using automabased programming.

Figure 1:
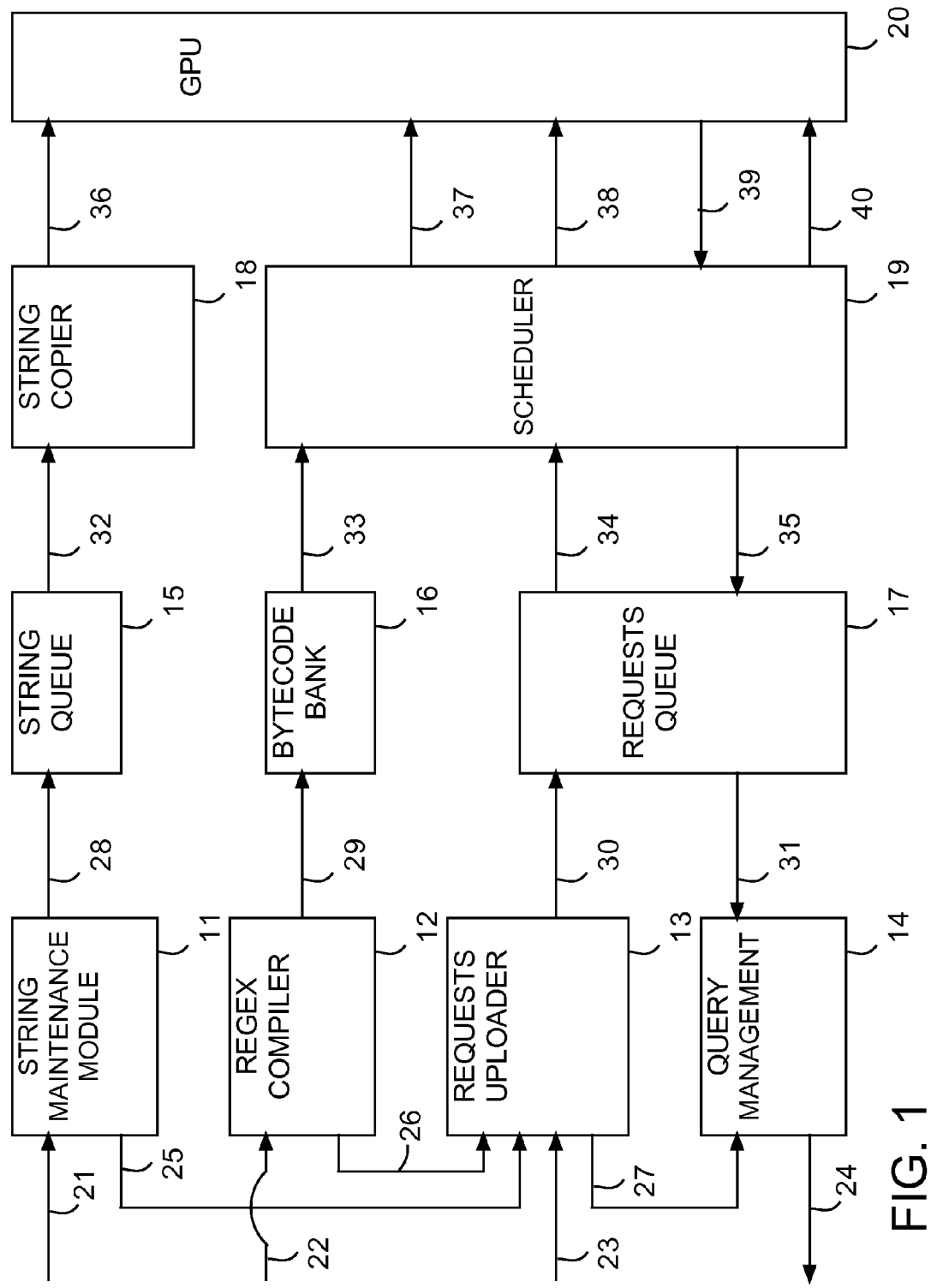
FIG. 1 is a simplified block diagram of a system architecture that allows for regular expression matching in accordance with an implementation.

Further, while FIG. 1 shows parallel processing being performed by a GPU, the parallel processing capability can be implemented using other parallel processing device such as other types of SIMDs, field programmable gate arrays (FPGAs) programmed to perform parallel processing and vectorized central processing units.

FIG. 1 is a simplified block diagram of a system architecture that allows for regular expression matching. Inputs to the system, represented in FIG. 1, include a string address on an input 21, a string range on an input 23 and a regular expression (regex) on an input 22. The string range demarks a range, within the data string located at the string address, which is to be searched for the regex.

A string maintenance module 11 receives the string address on input 21 and generates a string number. The string address and the string number are forwarded to a string queue 15, as represented by a line 28. String maintenance module 11 also forwards the string number to a requests uploader 13, as represented by a line 25.

A regex compiler 12 receives the regex on input 22 and generates a regex number and bytecode for the regex. The bytecode is for eventual execution by a virtual machine operating on a graphic processing unit (GPU) 20. The generation of bytecode for a regex, and the execution of the bytecode on a virtual machine within a GPU has been described, for example, by Russ Cox (2009): "Regular Expression Matching: the Virtual Machine Approach".

Regex compiler 12 forwards the regex number and the bytecode for the regex to a bytecode bank 16, as represented by a line 29. Regex compiler 12 also forwards the regex number to requests uploader 13, as represented by a line 26.

Requests uploader 13 receives the string number as represented by a line 25, the regex number as represented by a line 26 and the string range on input 23. Requests uploader 13 generates a request number. Requests uploader 13 forwards the string number, the regex number, the string range and the request number to a requests queue 19, as represented by a line 30. Requests uploader 13 also forwards the request number to a query manager 14, as represented by a line 27.

A scheduler 19 schedules tasks to be run on GPU 20. Scheduler 19 accesses a request number, a string number, a regex number and a string range from requests queue 17, as represented by a line 34. Based on the regex number from requests queue 17, scheduler 19 accesses byte code from bytecodes bank 16. A string copier 18 uses a string address from strings queue 15 to obtain from memory a string to be used for the request. GPU 20 receives requests and bytecode from scheduler 19, as represented respectively by a line 37 and a line 38. GPU 20 also receives from scheduler 19 an invocation signal, as represented by a line 40. GPU 20 obtains data strings from string copier 18, as represented by a line 36.

Results produced by GPU 20 are forwarded to scheduler 19, as represented by a line 39. Scheduler 19 forwards the results to requests queue 17, as presented by a line 35. Requests queue 17 forwards the results to query management 14, as represented by a line 31. Query management 14 produces the results as output, as represented by an output 24.

Within GPU 20, a virtual machine executes the bytecode. For example, the bytecode may be written in the form of a Turing machine—that in theory manipulates symbols on a strip of tape according to a table of rules—allowing the virtual machine to have the form indicated by the pseudo code set out in Table 1 below.

TABLE 1 next_state = table[current_state, tape[current_tape_index]]
current_tape_index += increment [current_state]
current_state = next_state The virtual machine can, for example, use simulated nondeterministic finite automata (NFA) for regular expression matching. For more information on using NFA for regular expression matching, see Russ Cox (2007), "Regular Expression Matching Can Be Simple And Fast (but is slow in Java, Perl, PHP, Python, Ruby, ... )", available at http://swtch.com/

~rsc/regexp/regexp1.html. Alternatively, other approaches such as backtracking or simulated deterministic finite automata (DFA) can be used.

When implementing the bytecode for the virtual machine, branches can be implemented using indicator variables. This has the advantage of using the arithmetic operations on the GPU, which are much more efficiently executed on a GPU than a branching instruction. For example, the branching instruction in Table 2 below:

TABLE 2

If (a == b) c = d; else c = e,

Can be implemented with the indicator variable set out in Table 3 below:

TABLE 3 c = e + (a == b) * (d – e).

Figure 2:
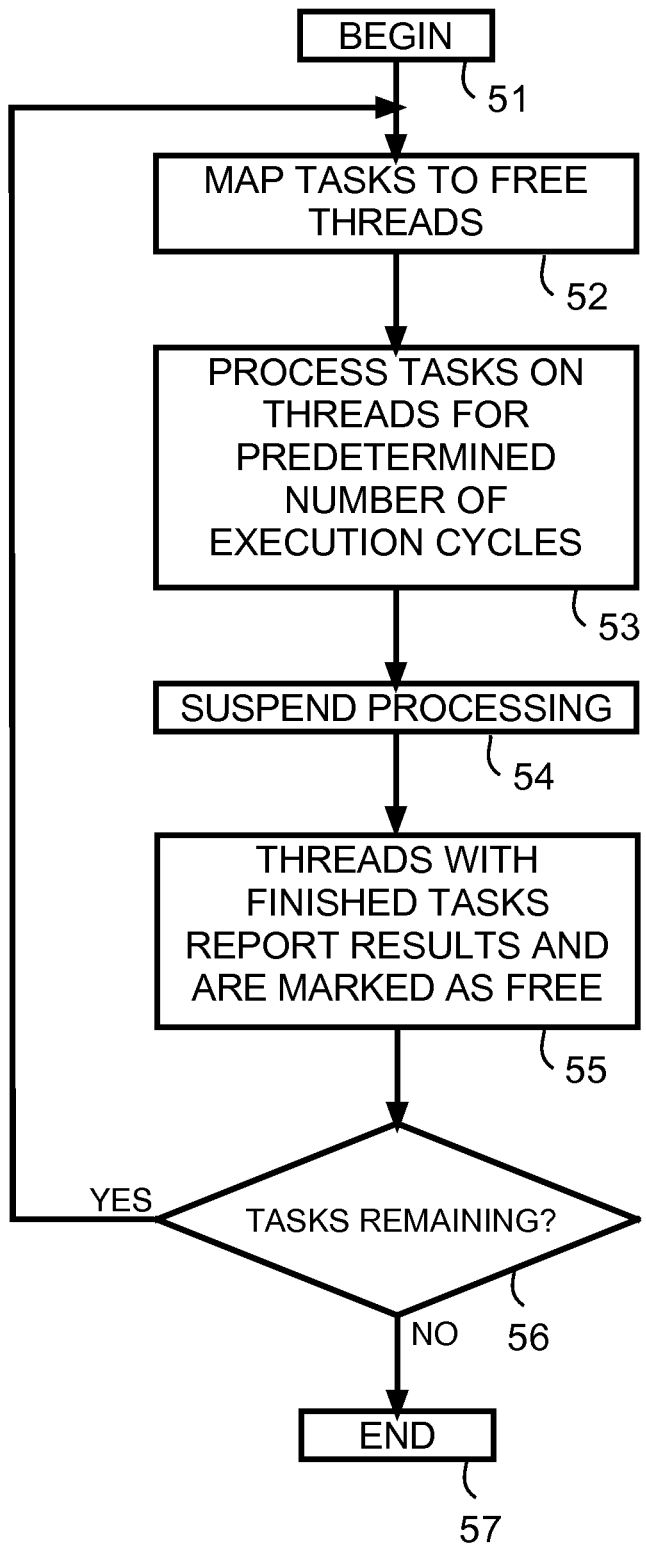
FIG. 2 is a simplified flowchart that describes assignment of tasks to execution threads in accordance with an implementation.

When there are more tasks to be performed by GPU 20 than there are execution threads available on GPU 20, the tasks can be mapped to execution threads as set out by the flowchart shown in FIG. 2.

In a block 51, bytecode for any regex in requests queue 17 are copied into cache memory of GPU 20. In a block 52, tasks in the cache memory are mapped to free execution threads of GPU 20. When there are more tasks in the cache than there are free execution threads of GPU 20, tasks not mapped to free threads remain in the cache memory of GPU 20.

In a block 53, GPU 20 operates for a predetermined number of execution cycles in order to process tasks that have been mapped onto the execution threads of GPU 20. The predetermined number of execution cycles can be selected, for example, based on statistical information about tasks to be performed, including, for example, average execution cycles required for tasks, mean execution time required for tasks and standard deviations. For example, the predetermined number of execution cycles can be dynamically computed.

Upon completion of the predetermined number of execution cycles, in a block 54, processing by GPU 20 is suspended. In a block 55, for execution threads that have finished their tasks, results are reported to scheduler 19 and these execution threads are marked as free. The execution threads that have finished their tasks are not free, i.e., are busy.

In a block 56, a check is made to determine if there are still execution threads that are tasks still remaining to be completed. If so, in a block 52, any tasks in the cache memory remaining in the cache memory of GPU 20 are mapped to free execution threads of GPU 20. When there are more tasks in the cache than there are free execution threads of GPU 20, tasks not mapped to free threads remain in the cache memory of GPU 20. And the process continues to block 53 and so on.

When in block 56 it is determined there are no task that have not been completed, in a block 57, processing is complete.

The foregoing discussion discloses and describes merely exemplary methods and embodiments. As will be understood by those familiar with the art, the disclosed subject matter may be embodied in other specific forms without departing from the spirit or characteristics thereof. Accordingly, the present disclosure is intended to be illustrative, but not limiting, of the scope of the invention, which is set forth in the following claims.

We claim:

1. A method for mapping tasks to execution threads of a parallel processing device, comprising:
repeating the following while there are still tasks in a list of tasks to be performed for matching regular expressions:
mapping tasks from the list of tasks to the execution threads of the parallel processing device that are free,
allowing the parallel processing device to perform the tasks mapped to the execution threads of the parallel processing device for a predetermined number of execution cycles, and
when the parallel processing device has performed the tasks mapped to the execution threads of the parallel processing device for the predetermined number of execution cycles, suspending the parallel processing device from further performing all of the tasks, wherein when the parallel processing device is suspended from further performing all of the tasks, the parallel processing device determines which execution threads have completed performance of mapped tasks and are therefore free.

2. A method as in claim 1 wherein the parallel processing device is a single instruction multiple data machine.

3. A method as in claim 1 wherein the parallel processing device is a graphics processing unit.

4. A method as in claim 1 wherein the parallel processing device is implemented by field programmable gate array (FPGA).

5. A method as in claim 1 additionally comprising:
reporting results when the parallel processing device is suspended from further performing the tasks.

6. A method as in claim 1 wherein the tasks are described by bytecode used to match regular expressions.

7. A method as in claim 1 wherein within the tasks, branches are implemented using indicator variables.

8. A system comprising,
a parallel processing device; and
a scheduler that schedules tasks to be performed by the parallel processing device;
wherein tasks are mapped to execution threads of the parallel processing device by repeating the following while there are still tasks in a list of tasks to be performed for matching regular expressions:
mapping tasks from the list of tasks to execution threads of the parallel processing device that are free,
allowing the parallel processing device to perform the tasks mapped to the execution threads of the parallel processing device for a predetermined number of execution cycles, and
when the parallel processing device has performed the tasks mapped to the execution threads of the parallel processing device for the predetermined number of execution cycles, suspending the parallel processing device from further performing the tasks, wherein when the parallel processing device is suspended from further performing the tasks, the parallel processing device determines which execution threads have completed performance of mapped tasks and are therefore free.

9. A system as in claim 8 wherein the parallel processing device is a graphics processing unit.

10. A system as in claim 8 additionally comprising:
a regular expression compiler that compiles regular expressions into bytecode, the bytecode being the basis of the tasks.

11. A system as in claim 8 additionally comprising:
a regular expression compiler that compiles regular expressions into bytecode; and,
a bytecode bank used for storing the bytecode, the bytecode being the basis of the tasks.

12. A method for matching regular expressions, the method comprising:
compiling the regular expressions into bytecode;
forwarding the bytecode to a parallel processing device, the bytecode to be executed as tasks on execution threads of the parallel processing device; and,
mapping tasks to the execution threads of the parallel processing device by repeating the following while there are still tasks in a list of tasks to be performed:
  mapping tasks from the list of tasks to execution threads of the parallel processing device that are free,
  allowing the parallel processing device to perform the tasks mapped to the execution threads of the parallel processing device for a predetermined number of execution cycles, and
  when the parallel processing device has performed the tasks mapped to the execution threads of the parallel processing device for the predetermined number of execution cycles, suspending the parallel processing device from further performing the tasks, wherein when the parallel processing device is suspended from further performing the tasks, the parallel processing device determines which execution threads have completed performance of mapped tasks and are therefore free.

\* \* \* \* \*